(12) United States Patent
Balkum

(10) Patent No.: US 6,488,766 B2
(45) Date of Patent: Dec. 3, 2002

(54) AGGREGATE USING RECYCLED PLASTICS

(76) Inventor: Earl T. Balkum, 6050 S. Detroit St., Littleton, CO (US) 80102

(*) Notice: Subject to any disclaimer, the term of this patent is extended or adjusted under 35 U.S.C. 154(b) by 0 days.

(21) Appl. No.: 09/984,504

(22) Filed: Oct. 30, 2001

(65) Prior Publication Data

US 2002/0050233 A1 May 2, 2002

Related U.S. Application Data

(63) Continuation-in-part of application No. 09/525,592, filed on Mar. 15, 2000, now abandoned.
(60) Provisional application No. 60/124,187, filed on Mar. 15, 1999.

(51) Int. Cl.$^7$ .............................................. C04B 18/20
(52) U.S. Cl. ...................................... 106/745; 106/724
(58) Field of Search ................................ 106/745, 724

(56) References Cited

U.S. PATENT DOCUMENTS

| | | | | |
|---|---|---|---|---|
| 5,422,051 A | * | 6/1995 | Sawyers | 264/31 |
| 5,676,895 A | * | 10/1997 | Toivola et al. | 264/112 |
| 5,702,199 A | | 12/1997 | Fishback et al. | |
| 5,785,419 A | | 7/1998 | McKelvey | |
| 5,879,601 A | | 3/1999 | Baker | |
| 5,936,015 A | | 8/1999 | Burns | |

FOREIGN PATENT DOCUMENTS

| | | | |
|---|---|---|---|
| JP | 08034647 | * | 2/1996 |
| JP | 08034648 | * | 2/1996 |
| JP | 11100919 | * | 4/1999 |
| JP | 11147739 | * | 6/1999 |
| WO | WO98/50318 | * | 11/1998 |

OTHER PUBLICATIONS (Note: All Japanese References are Abstracts).*

* cited by examiner

Primary Examiner—Paul Marcantoni
(74) Attorney, Agent, or Firm—Siemens Patent Services LC

(57) ABSTRACT

The present invention comprises an aggregate for use in cementitious building materials which-successfully incorporates plastic such as recycled plastic scrap of diverse types and a abrasive, inorganic grit particles. The plastic scrap is impregnated with a grit, such as sand, glass or other inorganic material. The plastic will then bond satisfactorily with a ark cementitious binder. Impregnation is accomplished by heating the plastic in particulate form, the grit or both, then mixing the plastic and grit. The aggregate can be reinforced by the addition of metallic or artificial fibers. Optionally, the aggregate can be formed with gas filled voids by adding sodium bicarbonate or borax during the heating process or by using plastics which "off-gas" during heating. In a further option, adhesive can be added to the cementitious mix, thereby fusing plastic particles together such that a skeleton providing reinforcement or support is formed in the cured aggregate.

7 Claims, 2 Drawing Sheets

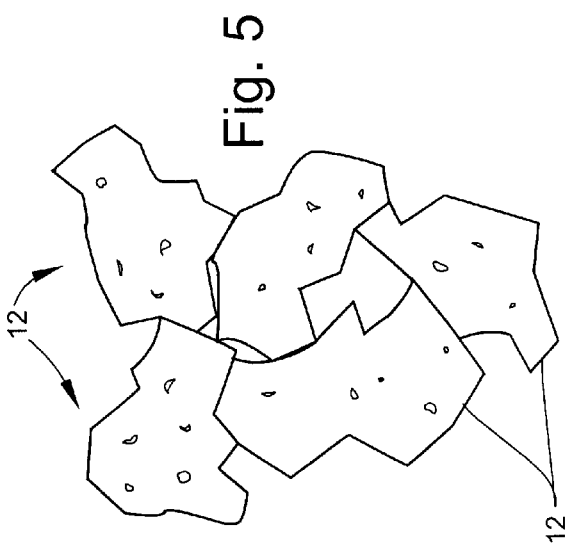
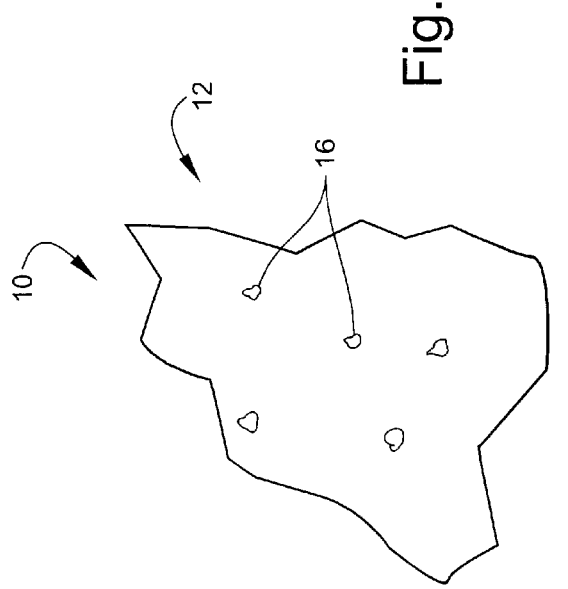
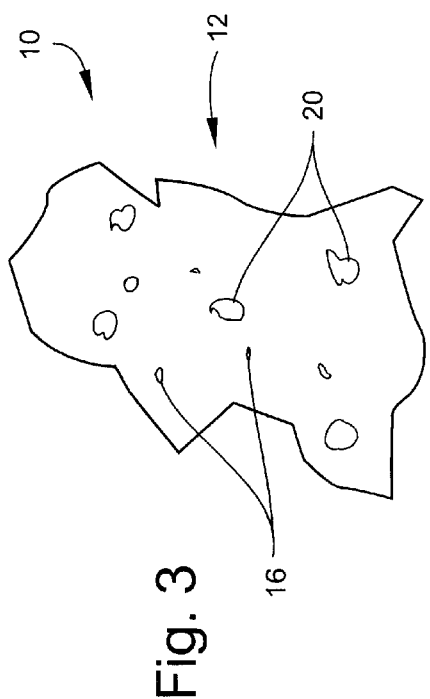
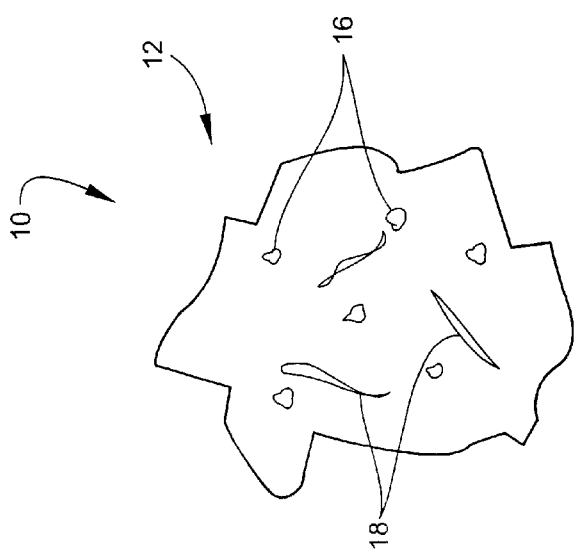

AGGREGATE USING RECYCLED PLASTICS

This application is related to Provisional patent application, Ser. No. 60/124,187, filed Mar. 15, 1999, and a Continuation-In-Part of application, Ser. No. 09/525,592, filed Mar. 15, 2000 now abandoned.

BACKGROUND OF THE INVENTION

1. Field of the Invention

The present invention relates to concrete aggregates, and more particularly to light weight aggregates incorporating plastic scrap as a constituent material thereof. The principal application of the invention is in concrete for building structures which utilize light weight concrete as building materials. The invention can be used as a building material for special structures which have need of the unique properties of the novel aggregate. Illustratively, floating structures, shock absorbing structures, acoustic and temperature insulating bodies, and blast attenuation bodies can utilize the novel aggregate.

2. Description of the Prior Art

Aggregates have long been utilized in the production of concrete for buildings, roads, bridges, sidewalks, and many other static structures. Concrete possesses high compressive strength, which is desirable for load bearing applications in buildings. However, concrete compositions offering the highest compressive strengths have the drawback that they are quite dense. Light weight compositions have been developed, but these usually exhibit commensurate decreases in compressive strength.

A modern trend is that of recycling scrap materials, particularly with regard to bulk building materials. This approach simultaneously solves two problems, those of providing building materials and of disposing of wastes. Plastic scraps in particular have received attention as potential constituent materials of bulk building materials. This is in part because plastics are very slow to decompose, and have a tendency to be disposed of in landfills. Some plastics are recycled for reuse, but this requires maintaining purity. Sorting methods are inadequate to the task of recovering and separating waste plastics in usable qualities and quantities.

The prior art has proposed disposal of scrap or waste plastics as constituents of building materials.

U.S. Pat. No. 5,702,199, issued to Gary M. Fishback et al. on Dec. 30, 1997, describes an asphaltic composition utilizing scrap plastics which do not have to be sorted. Plastic particles are treated, an exemplary method being exposure to heat in an oxygen deficient, reducing atmosphere, to render plastic particles more compatible with the asphaltic binder. The present invention uses cementitious rather than asphaltic binders, and further coats plastic particles with sand. The latter step is not employed in Fishback et al.

U.S. Pat. No. 5,879,601, issued to Richard David Baker on Mar. 9, 1999, describes an aggregate employing recycled plastic scrap in the form of particles or shreds. The binder utilized by Baker is a binary composition including a plastic resin and a catalyst which effects curing. By contrast, the present invention utilizes pozzolanic or cementitious binders, such as portland cement. Also, recycled plastic particles incorporated into the aggregate in the present invention are impregnated with sand. This feature is absent in the aggregate of Baker.

U.S. Pat. No. 5,676,895, issued to Matti Toivola on Oct. 14, 1997, describes an aggregate including recycled plastic scrap and minerals. Toivola subjects mixed scrap and minerals to elevated pressures. The present invention does not require pressure. Rather, the present invention utilizes cementitious binders. Also, although Toivola could possibly utilize sand as a mineral constituent, he does not coat plastic particles with sand, as occurs in the present invention.

U.S. Pat. No. 5,785,419, issued to Paul A. McKelvey on Jul. 28, 1998, describes an aggregate which incorporates pozzolans, such as portland cement and fly ash, together with cellulosic fibers. McKelvey does not employ plastic scrap as a constituent material. By contrast, the present invention includes plastic scrap. In a novel step absent in McKelvey, the plastic is impregnated with sand.

U.S. Pat. No. 5,936,015, issued to Bernard J. Burns on Aug. 10, 1999, sets forth an asphaltic composition which utilizes recycled rubber, such as from tires, and polyoctenamer, which is a polymerization agent. By contrast, the present invention utilizes cementitious binders rather than asphaltic binders, as seen in Burns. There is no polymerization agent such as polyoctenamer utilized in the present invention.

U.S. Pat. No. 5,422,051, issued to John P. Sawyers on Jun. 6, 1995, discloses an aggregate of recycled plastic, particulated and mixed with portland cement and sand/gravel fillers to produce a lighter weight concrete. Sawyers teaches no special treatment of the plastics other than shredding or pulverizing to a particulated form. The present invention, by contrast, imbeds sand into the particulated plastic to provide increased bonding between the plastics and the portland cement binder.

None of the above inventions and patents, taken either singly or in combination, is seen to describe the instant invention as claimed.

SUMMARY OF THE INVENTION

The present invention sets forth a novel aggregate which incorporates plastic scraps which may be substituted for mineral aggregates in cementitious concrete. The plastic scrap may be unsorted or unclassified waste of diverse types. This is a very useful feature, since plastics which are currently discarded in landfills due to their inability to be sorted and separated can readily be utilized in bulk to form the novel aggregate. Doing this will greatly decrease the burden currently imposed on waste landfill facilities. In particular, this will decrease the amount of materials which are most resistant to natural decomposition in landfills. Capacity and useful life of landfills will therefore be extended.

It has long been assumed that adding plastic scrap to building materials will lower the density thereof, with minimal degradation of material strength. However, this has remained an elusive goal since successful union of plastic with cementitious binders has proved failure prone. Interface between plastic and cementitious surfaces does not result in bonding. If not securely bonded, divisions, splits, cracks, and other structural discontinuities promote greatly reduced strength if not complete failure. Also, plastic particles tend to rise when the concrete is in a plastic or fluid state prior to curing. The present invention provides methods of effecting successful union between plastics and cementitious materials to overcome failure.

The resultant concrete is quite light, having densities on the order of half those of traditional concrete. Although slightly reduced, compressive strength does not suffer a commensurate decline. Only the most demanding load bearing applications cannot be satisfied by the novel aggregate. Inclusion of plastics increases properties of resilience, acoustic and thermal insulation, vibration, shock and explosion resistance, weathering and chemical deterioration, in addition to reduced density. The novel aggregate is therefore useful for protective outer coverings as well as for traditional uses.

Testing has shown that when PVC is used, a fire retardant/suppressant wall is created. As the PVC is heated by a fire, it "off gasses" chlorine gas retarding the spread of fire on the surface and suppressing flames within the structure.

Plastic scrap particles are impregnated with sand to improve adhesion of the cementitious binder. This can be accomplished by heating the plastic, the sand or both. Heat softens the surface of the plastic, thereby allowing sand to penetrate the plastic and become embedded therein. Sand impregnated plastic particles exhibit superior adhesion to cementitious binders, as compared with non-impregnated plastics. Separation of plastic and cementitious interfaces is avoided, and plastic particles are entrapped within and bonded to fluid cementitious aggregates prior to curing. The plastic particles thus avoid rising or floating when the concrete is in the fluid or plastic state. Bonding remains effective after curing, so that the resultant cured aggregate exhibits combined advantages of concrete and plastic particle inclusions.

Concretes incorporating the novel aggregates, prior to curing, are susceptible to being formed and to being reinforced. One method of reinforcement is to add into the mix adhesives which will cause adjacent particles of plastic of the inventive aggregate to bond together to establish an internal frame or skeleton, thereby increasing tensile strength of the cured concrete. White glue (PVA) and methylethyl ketone are examples of such materials.

If desired, density of the aggregate can be reduced by inducing bubbling or foaming. This is accomplished by incorporating plastic wastes which generate gasses at temperatures attained during heating for the purpose of impregnating plastic particles with sand. Polyvinyl chloride plastics are among those which exhibit gas discharges when heated. Aggregates of lower density produced by inducing gas formation provide further enhanced acoustic and temperature insulation, and shock and impact absorption. Voids created by gas bubbles can also be used to impregnate the aggregate with materials which perform a specific auxiliary function. Illustratively, aggregates impregnated with absorbent clay could be utilized to build aquatic structures having the capability of absorbing chemical spills.

Accordingly, it is one object of the invention to provide strong, low density concrete aggregates.

It is another object of the invention to improve properties of resilience, acoustic and thermal insulation, vibration, shock and explosion resistance, weathering and chemical deterioration of concrete through inclusion of the inventive aggregate.

It is a further object of the invention to recycle plastic wastes, thereby removing the wastes from landfills.

Still another object of the invention is to overcome propensity of plastic materials to fail to bond to cementitious binders.

An additional object of the invention is to provide concrete aggregates incorporating plastic waste materials as structural constituents.

Yet another object of the invention is to provide concrete a aggregates which serve as a fire retardant/suppressant.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a diagrammatic cross sectional view of the inventive aggregate.

FIG. 2 is a diagrammatic cross sectional view of FIG. 1 modified by the addition of reinforcing fibers.

FIG. 3 is a diagrammatic cross sectional view of FIG. 1 modified by formation of gas filled voids in the aggregate.

FIG. 5 is a diagrammatic cross sectional view of an aggregate produced according to the present invention wherein plastic particles are fused together to form elongate structures.

DETAILED DESCRIPTION OF THE PREFERRED EMBODIMENTS

Figure 4:
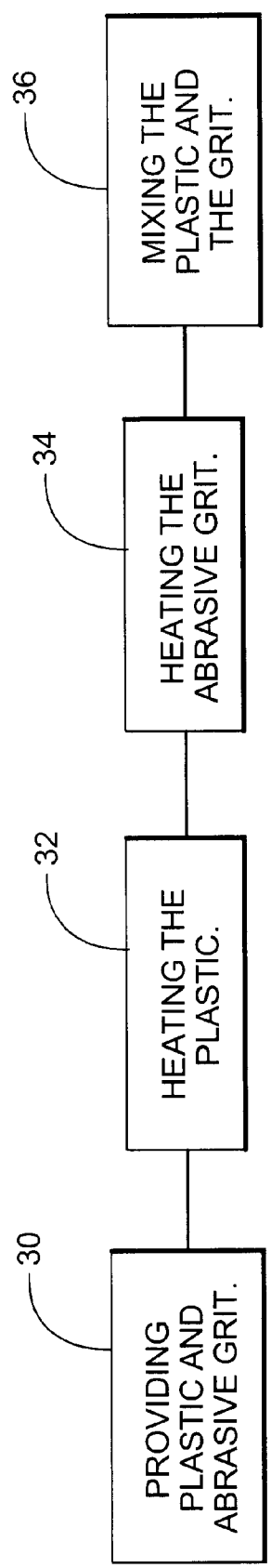
FIG. 4 is a block diagram of steps of a method of manufacturing the novel aggregate, and is read from left to right.

The present invention comprises a plastic aggregate for inclusion in a concrete mix. For the purpose of disclosure the exact composition of the concrete mix is immaterial, although periodic references will be made to the concrete mix, as it relates to the inventive aggregate.

FIG. 1 of the drawings shows a plastic particle 12 of the inventive aggregate 10. Plastic particles 12 may comprise granular particles of plastic waste or scrap 14. There is no requirement that the constituency of plastic particles 12 be homogeneous, of equal size, or of any particular configuration. Plastic scraps which would otherwise be disposed of in landfills provide a suitable source of raw material for plastic particles 12. Plastic particles 12 are preferably formed by comminuting large pieces of plastic such that a relatively uniform particulate or granular size results. Plastic particles 12 may be sorted by passing through a mesh screen of predetermined opening dimensions. This is a conventional method of sorting gravel and the like, and is suitable for assuring that plastic particles 12 do not exceed a predetermined maximum diameter or comparable dimension.

Close inspection of FIG. 1 reveals that each one plastic particle 12 is impregnated with abrasive, inorganic grit particles, such as sand 16, embedded in each plastic particle 12. Any type of grit particle, such as glass and ceramics, would be acceptable in place of sand 16, provided that it is inflexible, can embed within plastic particles 12, and bonds to the cementitious binder of a concrete mix.

Dimensions of plastic particles 12 are determined with the application in mind, particularly that of the minimum expected thickness of any concrete slab or wall to be formed. It is merely desired that plastic particles 12 account for a significant proportion of the volume of the cured concrete.

It should be emphasized that FIG. 1 is diagrammatic only. In many cases, less than half of each grain of sand 16 may be in contact with the constituent plastic of plastic particles 12. Some sand will not adhere to plastic particles 12, and will separate therefrom. This does not impair the concrete mix since sand is frequently intentionally added to cement and concrete compositions.

Referring now to FIG. 2, plastic particle 12 may be reinforced by imbedding high strength, heat resistant reinforcing fibers 18 such as, but not limited to fiber glass, carbon fiber and metal wire, to function as tensile inclusion, simultaneously with grit particles 16.

Turning now to FIG. 3, gas filled voids 20 may be formed within plastic particles 12. Voids 20 may be intentionally produced in plastic particles 12 during the heating process, explained further hereinbelow, by the "off-gassing" of certain plastics such as polyvinyl chlorides, by the introduction of sodium bicarbonate and borax, or both, generating gas bubbles which then permeate through plastic particle 12. Although most concrete includes air bubbles due to entrainment of air during mixing and pouring, these are generally unintentionally formed. By contrast, voids 20 are provided intentionally to adjust density or to provide collapsible areas which can accommodate penetrations, slight flexure, and other intrusions to the concrete.

Aggregate 10 is prepared by the following method. As shown in FIG. 4, in a step 30, particles of plastic and particles of abrasive grit having dimensions less than those of the plastic particles are provided. Either the particles of plastic are heated, seen as step 32, or the particles of grit are heated, seen as step 34, or both are heated. Alternatively stated, and as summarized in a step 32, at least one of the plastic and the abrasive grit is heated. Voids 20, described hereinabove, if desired would be formed during step 32 either by "off-gassing" or the introduction of sodium bicarbonate or borax. Likewise, heat resistant reinforcing fibers 18, if desired, may be introduced during step 34. If unheated, the plastic or the grit is at an ambient temperature. Subsequently, in a step 36, raw particles of plastic and the particles of abrasive grit 16 are mixed together, thereby causing the particles of plastic to become impregnated with particles of abrasive grit 16 and heat resistant reinforcing fiber 18.

Which constituent material is heated depends upon the nature of the plastic and its particle size. If the plastic particles 12 are at or near the final desired size, and heating the plastic particles 12 would risk fusing particles 12 together, thereby causing fused particles to exceed the desired size, then the grit only is heated. If fusion due to heat is not a concern, or when heat resistant reinforcing fibers or gas filled voids are desired, then only the plastic can be heated if it is desired to limit the number of heating hoppers (not shown) to one. If, on the other hand, the number of heating hoppers need not be limited, but rapid heating or rapid conversion of plastic particles to the impregnated condition is to be effected, then it would be most effective to heat both the grit and the plastic. Plastic particles 12 and abrasive grit 16 are typically heated to a range of 120°–480° C. (260°–900° F.) for a period of 2 second to 30 seconds, depending on the composition, and thus the melting temperature of the plastic being processed, higher temperatures requiring less exposure time.

In forming a concrete structure using the inventive aggregate 10, it is possible to fuse plastic particles 12 together to form a skeleton 44 of connected plastic particles 12 within the concrete 14 (see FIG. 5). The resulting structure provides a generally sintered effect, or the effect of an open celled synthetic foam (not shown) wherein each member is connected to at least one other member. Skeleton 44 improves the strength of the cured concrete. Skeleton 44 is formed by adding a suitable adhesive such as methyethyl ketone or white glue of a type available as "Aleene's Original Tacky Glue" to the concrete mix while in a fluid state. Of course, it is possible that not all particles 12 of plastic will join skeleton 44. However, this is not objectionable as individual, separated particles of plastic, as seen in the embodiment of FIG. 10, have resulted in satisfactory aggregates.

The present invention may be used exclusively in lieu of mineral aggregate, using a 4 to 1 ratio aggregate to cementitious binder, rendering a range of 30–80% plastic by volume and a minimum of 30% plastic by weight.

Walls containing 15–25% scrap PVC have been found to provide a fire retardant/suppressant bonus by displacing oxygen with chlorine gas as the PVC "off-gasses" at high heat. The chlorine gas "off-gasses" into the porous cementitious binder, then to the surface, creating a fire shield and extinguishing flames.

It is to be understood that the present invention is not limited to the embodiments described above, but encompasses any and all embodiments within the scope of the following claims.

What is claimed is:

1. A method for manufacturing an aggregate for use in cementitious building materials comprising the steps of:
   providing particles of plastic and particles of abrasive grit having diameters less than the diameters of the plastic particles;
   heating at least one of the group of said plastic particles and said abrasive grit to a temperature within a range of approximately 120°–480° C.; and then mixing said particles of plastic and said particles of abrasive grit together for a period of time within a range of approximately 2 seconds to 30 seconds, thereby causing said particles of plastic to become impregnated with said particles of abrasive grit.

2. The method, as defined in claim 1, wherein said plastic particles are further impregnated with high strength, heat resistant reinforcing fibers, said reinforcing fibers comprising at least one selected from the group consisting of fiber glass, carbon fiber, and metal wire.

3. The method, as defined in claim 2, wherein said reinforcing fibers are imbedded within said plastic particles during said heating step.

4. The method, as defined in to claim 1, wherein said step of heating at least one of the group of said plastic particles and said abrasive grit comprises heating said particles of plastic to a temperature within a range of approximately 120°–480° C., and then mixing the particles of abrasive grit, at an ambient temperature, with the heated particles of plastic for a period of time within a range of approximately 2 seconds to 30 seconds.

5. The method, as defined in claim 1, wherein said step of heating at least one of the group of said particles of plastic and said particles of abrasive grit comprises heating said particles of abrasive grit to a temperature-within a range of approximately 120°–480° C., and then mixing said particles of plastic, at an ambient temperature, with said heated particles of abrasive grit for a period of time within a range of approximately 2 seconds to 30 seconds.

6. The method, as defined in claim 1, wherein said step of heating at least one of the group of said particles of plastic and said particles of abrasive grit comprises:

heating said particles of abrasive grit to a temperature within a range of approximately 120°–480° C.

heating said particles of plastic to a temperature within a range of approximately 120°–480° C., and mixing said particles of abrasive grit with said particles of plastic for a period of time within a range of approximately 2 seconds to 30 seconds.

7. The method, as defined in claim 1, further comprising at least one step selected from the group consisting of impregnating said plastic particles with high strength, heat resistant reinforcing fibers during said heating and introducing gas filled voids into said plastic particles during said heating step.

\* \* \* \* \*